United States Patent (10) Patent No.: US 7,727,393 B2
Lee et al. (45) Date of Patent: Jun. 1, 2010

(54) SUBMERGED HOLLOW FIBER MEMBRANE MODULE

(75) Inventors: Kwang Jin Lee, Suwon-si (KR); Moo Seok Lee, Seoul (KR); Yong Cheol Shin, Seoul (KR); Seong Hak Choi, Suwon-si (KR); Young Tai Woo, Seoul (KR)

(73) Assignee: Kolon Industries Inc., Kwacheon-si (KR)

( * ) Notice: Subject to any disclaimer, the term of this patent is extended or adjusted under 35 U.S.C. 154(b) by 391 days.

(21) Appl. No.: 10/593,480

(22) PCT Filed: Apr. 6, 2005

(86) PCT No.: PCT/KR2005/000979
§ 371 (c)(1),
(2), (4) Date: Sep. 20, 2006

(87) PCT Pub. No.: WO2006/004309
PCT Pub. Date: Jan. 12, 2006

(65) Prior Publication Data
US 2008/0230466 A1 Sep. 25, 2008

(30) Foreign Application Priority Data
Apr. 7, 2004 (KR) ........................ 10-2004-0023723

(51) Int. Cl.
*B01D 63/02* (2006.01)
*B01D 61/00* (2006.01)
(52) U.S. Cl. ................. 210/321.69; 210/321.72; 210/321.78; 210/321.79; 210/321.8; 210/650
(58) Field of Classification Search ................. 210/650, 210/652, 321.69, 500.23, 490, 321.72, 321.78–321.8
See application file for complete search history.

(56) References Cited

U.S. PATENT DOCUMENTS 5,158,581 A 10/1992 Coplan
5,405,528 A * 4/1995 Selbie et al. ................. 210/232

(Continued)

FOREIGN PATENT DOCUMENTS

JP 6-343837 A 12/1994

(Continued)

*Primary Examiner*—Krishnan S Menon
*Assistant Examiner*—Katherine Zalasky
(74) *Attorney, Agent, or Firm*—Birch, Stewart, Kolasch & Birch, LLP

(57) ABSTRACT

Disclosed is a submerged hollow fiber membrane module which is easy to expand, has a small installation area, and exhibits excellent contamination prevention and durability. The submerged hollow fiber membrane module comprises: (I) a module body divided into two portions which has a permeated water collection space (5) and a permeated water outlet (3); (II) module support tubes (17) which are vertically connected to the upper and lower ends of the module body; (III) a plate type module header insertion layer which is provided with hollow fiber membrane spaces (10), and is inserted into the module body; (IV) a plate type diffusion layer which is provided with a diffusion port (4) and diffusion tubes (11) and is inserted into the module body subsequent to the module header insertion layer; and (V) module headers which are inserted into the module header insertion layer.

13 Claims, 7 Drawing Sheets

U.S. PATENT DOCUMENTS

| | | | |
|---|---|---|---|
| 5,472,607 A * | 12/1995 | Mailvaganam et al. | 210/490 |
| 6,328,886 B1 * | 12/2001 | Miyashita et al. | 210/220 |
| 6,454,943 B1 * | 9/2002 | Koenhen | 210/500.21 |
| 6,682,652 B2 * | 1/2004 | Mahendran et al. | 210/195.2 |
| 2002/0139748 A1 * | 10/2002 | Cote et al. | 210/636 |
| 2003/0178365 A1 * | 9/2003 | Zha et al. | 210/636 |

FOREIGN PATENT DOCUMENTS

| | | |
|---|---|---|
| JP | 9-192442 A | 7/1997 |
| KR | 2003-0064827 A | 8/2003 |
| KR | 2004-0020045 A | 3/2004 |

* cited by examiner

FIG. 8
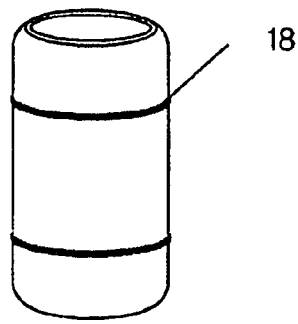
FIG. 9
(a)
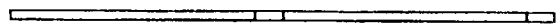
(b)
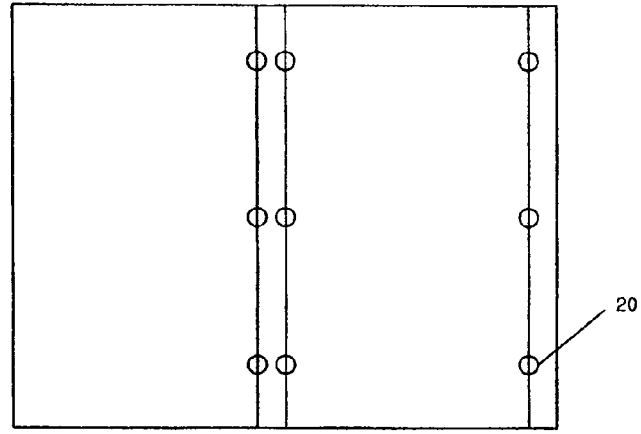
(c)
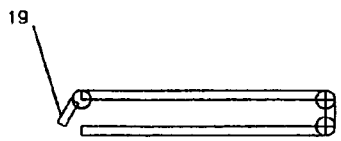

SUBMERGED HOLLOW FIBER MEMBRANE MODULE

TECHNICAL FIELD

The present invention relates to a separation membrane module for water treatment, such as waste water treatment, sewage treatment, water purification, etc., and more particularly, to a submerged hollow fiber membrane module, which has a number of unit modules integrated in a single cartridge so as to be suitable for large-scale treatment.

The invention also relates to a submerged hollow fiber membrane module, which is suitable for large-scale water treatment because it is easily expandable and has a small installation area, and which is able to prevent contamination via efficient diffusion action from the inside and outside of the module, and exhibits excellent durability.

The invention relates to a submerged hollow membrane module, which allows manufacture of a diffuser within the module in a more economical manner, while simultaneously exhibiting increased diffusion efficiency, and thus is optimized for application to large-scale systems.

In recent times, demand for water treatment utilizing a membrane process is increasing in conjunction with the increasing importance of the environment in each country, with developed countries, like the US and the European Union, taking the lead.

Although the membrane process has been recognized for its excellence in automatic operation, life span and post-treatment water quality, it has yet to be utilized on a wide scale due to its lower economic efficiency when compared to other prior art processes.

However, with the improvement in living standards, and the increasing emphasis placed upon health and life, the cost of the membrane process is lowering and cases of application are increasing.

BACKGROUND ART

Membranes used for water treatment include various types such as a tube type, a hollow fiber type, a film type, a spiral-wounded type, etc. Among them, the hollow fiber type membrane is advantageous for water treatment due to a high throughput per installation area, while it is generally made into such a module in which membranes are protected by a cylindrical case because it has a low mechanical strength due to the inherent characteristics of the membrane structure.

A module of this type is problematic in that permeability degradation can occur from fouling since it is impossible to effectively remove contaminants accumulated on the membrane surfaces, as is generally known in the case of wastewater treatment. To overcome this problem, a submerged module without a case has been devised. But, unless the strength of membranes is sufficiently high, degradation of system reliability due to membrane damage can cause serious problems. In addition, unless diffusion action using air is carried out efficiently, a fouling problem may still occur and this may lead to problems such as increase in operation pressure and decrease in flux.

To minimize permeability loss of the submerged module, contaminants accumulated on the membranes have to be removed through backflushing of the module and by a strong and efficient diffusion action. Various techniques for this are well known.

Korean Registered Patent No. 022807 discloses a module in which hollow fiber membranes are spread out in a conical form, folded in a U-shape and fixed in order to prevent membrane contamination under slow diffusion conditions.

However, in this case, the volume of the module must be increased, and it is not easy to interconnect modules for the purpose of increasing throughput from a structural viewpoint.

In a submerged module disclosed in Korean Registered Patent No. 0236921, an air injection port and a filtered water outlet are connected to one portion of the module, with a hollow fiber membrane fixed at both ends in an I-shape, as opposed to the foldable U-shape of Korean Registered Patent No. 022807.

This module structure is inefficient for the arrangement of a collecting pipe and an air injection pipe in coupling a multiplicity of modules for the purpose of increasing throughput, and exhibits poor workability in the manufacture of a module since a filtered water outlet and an air injection port co-exist in one portion of the module.

Especially, in the case of modules used for large-scale water treatment, a rectangular type module with a bundle of widely spaced hollow fiber membranes, rather than a cylindrical type module, is advantageous in collecting a number of modules within a small installation area.

While a module of this type has a merit in that a large volume of liquid can be treated within a small installation area, the module must exhibit efficient diffusion, as there is a high likelihood that sediments may be accumulated due to the high density of the hollow fiber membrane bundles.

In this procedure, due to direct impact applied to the membranes, post-treatment water quality may be degraded due to membrane damaged encountered after extended use, and water leakage may arise from the weakening of joint regions between module parts.

Further, in large-scale water treatment applications, in the case that a number of modules are coupled according to throughput, it is difficult to minimize the installation area and make coupling easy since efficient arrangement is essentially impossible.

Economic efficiency must also be considered.

For the mass production of modules, the structure should be as simple as possible so as to minimize the manufacturing cost of each part, and materials of parts and so on should also be considered.

The minimization of manufacturing costs, as well as efficiency, should be considered in production.

All these conditions are manifested in terms of economic efficiency, and module manufacturing techniques exhibiting high economic efficiency are techniques applicable to mass production.

DISCLOSURE OF THE INVENTION

Technical Objective

To solve the aforementioned prior art problems, it is an object of the present invention to provide a submerged module that exhibits high module throughput for application to large-scale water treatment, allows two-dimensional or three-dimensional expansion of modules, can prevent water leakage caused by the weakening of joint regions after extended usage by the minimization of every module part including a connecting part, and can maximize workability and economic efficiency in the manufacture of a module.

Additionally, the module of this invention has such a structure that can shake hollow fiber membranes with air generated from three surfaces through a diffusion part mounted to the module for enabling effective diffusion action so as to prevent a flow rate reduction or pressure increase arising from the accumulation of contaminants.

Additionally, costly metal parts are minimized for economic efficiency in the manufacture of a module.

In other words, diffusion tubes 11 for diffusion action are made of moldable parts so that every part excluding support tubes for supporting a module may be manufactured via molding.

It is another object of the present invention to provide a connecting means which can easily expand the processing capacity of a module without increasing the necessary project area by coupling hollow fiber membrane module units of the same shape to each other.

Accordingly, the objects of the present invention are to provide a submerged hollow fiber large membrane module, which exhibits a high flow rate in small installation area, offers easy module coupling and economic module manufacturability, maintains a stable flux via efficient diffusion conditions and prevents water leakage caused by membrane damage and the weakening of module joint regions.

Technical Means for Solving the Problems

To achieve the above objects, there is provided a submerged hollow fiber large membrane module according to the present invention, comprising: [I] a module body divided into two sections which has a permeated water collection space 5 for collecting water filtered through hollow fiber membranes and a permeated water outlet 3 for discharging the water collected in the permeated water collection space; [II] module support tubes which are vertically connected to the upper and lower ends of the module body, respectively; [III] a plate type module header insertion layer which is provided with hollow fiber membrane spaces 10, and is inserted into the module body to form the permeated water collection space 5 in the module body; [IV] a plate type diffusion layer which is provided at an upper portion thereof with a diffusion port 4, has diffusion tubes 11 surrounding a bundle of hollow fiber membranes 16 by three surfaces while keeping a predetermined distance from module headers, and is inserted into the module body subsequent to the module header insertion layer to form a diffusion space 7 within the module body; and [V] the module headers which have the bundle of hollow fiber membranes 16 fixed therein by a potting liquid 22 and are inserted into the module header insertion layer, the bundle of hollow fiber membranes being opened in parallel to permeated water discharge surfaces of both opposite ends so as to form the permeated water collection space 5 in the module body.

Hereinafter, the present invention will be described in detail with reference to the accompanying drawings.

FIGS. 1(a) to 1(c) are a plan view, front view and right side view of a module body of a submerged hollow fiber large membrane module according to the present invention.

A permeated water outlet 3, in which permeated water is collected and passes through, and an air injection port 4 for diffusion within the module are formed on the upper end of the module body. A layer is formed within the module body by assembling a module header insertion layer as shown in FIGS. 2(a) to 2(C) and a diffusion layer as shown in FIGS. 3(a) to 3(c) so as to divide the module body into a permeated water collection space 5 and a diffusion space 7.

An interspace 6 is formed between the permeated water collection space 5 and the diffusion space 7 to separate these spaces.

The outside of the module body is openable. Although water is usually prevented from leaking out of the module body by means of fixing screws and a module body cover 2, the module body may be opened in order to locate and repair the cause of malfunction, such as leakage of the module or the like, when such malfunction is detected.

Four module support tube fixing grooves 8 for inserting module support tubes 17 are provided within the module body.

The module support tubes 17 can be fixed by various kinds of adhesives such as urethane or by a helix.

The overall shape of the module with the module support tubes 17 inserted therein is shown in FIGS. 6 and 7.

FIGS. 2(a) to 2(c) are a plan view, front view and right side view of a module header insertion layer used in constructing the present invention.

First of all, the module head insertion layer is assembled to the module body to form a permeated water collection space 5.

The permeated water collection space 5 is formed between an outside wall of the module body and the module header insertion layer.

The module header insertion layer is provided with hollow fiber membrane spaces 10 for inserting hollow fiber membranes 16.

After the module header insertion layer is assembled, and once module headers, the hollow fiber membranes 16 of which have been potted with an adhesive 22, are inserted into the module header insertion layer, water having passed through the hollow fiber membranes 16 is prevented from leaking out of the permeated water collection space 5, made by the module body and the module header insertion layer, excluding the permeated water outlet 3, unless the leakage of the module occurs due to a problem in assembly.

FIGS. 3(a) to 3(c) are a plan view, front view, and right side view, respectively, of a diffusion layer used in constructing the present invention.

After the module header insertion layer is assembled to the module body, the diffusion layer is assembled thereon. Due to this, another interspace 6 is formed over the permeated water collection space 5.

The interspace 6 is a space that is formed between the permeated water collection space 5 and the diffusion space 7.

Unlike the module header insertion layer, the above diffusion layer does not form a completely enclosed space, but only supports the hollow fiber membranes 16 extending from the module headers to some extent. The diffusion layer facilitates the passage of air from the air injection port 4 through diffusion tubes 11, such that the air attacks the hollow fiber membranes 16 more efficiently via small diffusion holes perforated in the diffusion tubes 11, and dislodges particulate contaminants or the like present on the surface of the hollow fiber membranes 16.

In case of the submerged module, the portions close to the module headers are most apt to be contaminated and are the main causes of degradation of the module performance, thus it is very important that efficient diffusion be employed to ensure that these portions remain free from contamination.

In the present invention, since diffusion exposure can be performed intensively on primary contaminated portions of the hollow fiber membrane modules 16, the duration of module performance is greatly lengthened.

FIGS. 4(a) to 4(c) are a plan view, front view and right side view, respectively, of a module header used in constructing the present invention.

The module headers are the portions where the hollow fiber membranes 16 are attached along with a potting liquid 22. The potting liquid 22 is a kind of adhesive for attaching the hollow fiber membranes 16 into the hollow fiber membrane spaces 10 of the module headers, and includes general adhesives, in particular, urethane or epoxy.

In FIG. 4(*c*), showing the right side view of the module header, a module header fixing ridge 13, which is the portion for inserting the module headers into the module header insertion layer, is projected from the bottom part of the module header. After insertion, the fixing ridge 13 between the module header insertion layer and the module headers is sealed with an adhesive so as to prevent water leakage.

A separation membrane protection device fixing ridge 12 projected from the top parts of the module headers serves to be coupled with a hollow fiber membrane protection cover as shown in FIGS. 9(*a*) to 9(*c*).

The hollow fiber membrane protection cover serves to prevent the hollow fiber membranes 16 coupled to the module headers from damage from exposure during a module manufacturing process.

A module header divider 15 is disposed in a direction intersecting the length of the module headers within the spaces 10 where the hollow fiber membranes 16 are attached.

The module header divider 15 serves to uniformly spread the highly viscous potting liquid 22 upon injection and assists in the permeation of the potting liquid 22 within the hollow fiber membranes 16. In addition, the module header divider 15 serves to prevent dimensional stability from being decreased due to wrenching caused by cooling in the manufacture of a module header mold.

FIG. 5 is a schematic view showing the module header insertion layer, the diffusion layer, and the module headers, with hollow fiber membranes 16 attached thereto, coupled to the module body.

FIG. 6 is a plan view of a submerged hollow fiber membrane module according to the present invention, and FIG. 7 is a side cross sectional view of the hollow fiber membrane module according to the present invention.

Only a few sections of the hollow fiber membranes 16 are shown for convenience.

A module header insertion layer, a diffusion layer, and module headers are inserted into a module body in order, hollow fiber membranes 16 are arranged in hollow fiber membrane spaces 10, and diffusion tubes 11 are arranged between the module headers. Via such configuration every surface of both sides of the hollow fiber membranes can be uniformly air-washed via diffusion holes evenly spread over the diffusion tubes 11.

FIG. 10 is a cross sectional schematic view showing the module header and diffusion layer parts in the module body when cut out in the longitudinal and horizontal directions of the hollow fiber membranes.

In FIG. 10, the module provided by this invention consists of a bundle of hollow fiber membranes 16 having a separation membrane function, in which water permeating from the outside of the membranes is collected in a permeated water collection space 5 at both of the module headers through the inside of the membranes by a suction pressure or by a natural pressure created by the head of water.

At this point, the tips of the hollow fiber membranes are fixed to permeated water discharge surfaces 21, present within the module headers, by a potting liquid 22, opened in a manner to be parallel to the discharge surfaces 21, which makes it possible to collect permeated water within the permeated water collection space 5 through the permeated water discharge surfaces 21.

The permeated water collected in the permeated water collection space 5 flows out through a permeated water outlet 3 of the module body connected to a permeated water withdrawal device such as a suction pump or the like. At this time, the permeated water outlet 3 of the module headers may exist one by one on upper and lower surfaces by considering expandability obtained by coupling module units. In case of this structure, in order to operate using the module units alone, it is possible that each outlet is connected to the filtered water withdrawal device, or only the permeated water outlet 3 on the upper surface is connected and used by closing the permeated water outlet 3 on the lower surface of the module body using a closing and connecting member.

The length of the hollow fiber membranes 16, that is, the distance between the module headers, is preferably 80 to 150 cm. By performing the water collection function symmetrically using the two module headers as described above, pressure loss caused by the length of the hollow fiber membranes 16 is effectively compensated.

The permeated water collected in the permeated water collection space 5 of the module body by a pressure during a filtering process is permeated via fine holes existing on the outer surfaces of the hollow fiber membranes. If leakage occurs through a gap or the like on the module, the filtering function is degraded.

The module provided by this invention can reduce the weight of the module, enable a reduction in module manufacturing costs, and can prevent water leakage caused by the weakening of joint regions between parts because the parts are made of moldable plastic and are combined simply using the hollow fiber membranes 16 and an adhesive.

At this time, the module body may be of a shape selected from the group consisting of cylindrical and rectangular shapes.

Meanwhile, in the treatment of wastewater containing high concentrations of buoyant materials, a flow rate reduction or a pressure increase may arise by the accumulation of contaminants. Thus, a filtering process is accompanied by a diffusion process.

The module provided by this invention does not require any particular diffusion device since the module is provided with a diffusion function. It is possible to manufacture an efficient, diffusible module in a simple and economical fashion by air-washing main contaminated regions of the separation membranes 16 within the module uniformly, strongly and intensively, by means of the module diffusion tubes 11.

In other words, the diffusion part of the module is comprised of an air injection port 4 in the module body and diffusion tubes 11 spaced a slight distance from the module headers in parallel thereto. The main contaminated regions of the hollow fiber membranes, buried in the module headers and extended outward, are surrounded by the diffusion tubes 11, and diffusion holes are uniformly distributed through the surface of the diffusion tubes 11, thereby enabling an efficient diffusion in the module.

At this time, the air injection port 4 of the module headers may exist one by one on upper and lower surfaces by considering expandability obtained by coupling module units.

In case of this structure, in order to operate using the module units alone, it is possible to connect the air injection ports 4 between each module via a connecting member as shown in FIG. 8, and then only the air injection port 4 of the upper module body is connected and used by closing the air injection port of the lower module using a closing and connecting member.

FIG. 8 is a perspective view of the connecting member.

The connecting member has a passage for communicating permeated water and air between the two module headers serially connected to each other and the diffusion tubes.

In order to facilitate efficient diffusion, hollow fiber membranes are focused more densely on the neighboring parts of the module headers than on the middle part of the module, and spacing between the membranes is relatively smaller, thus the accumulation of contaminants is focused on these parts. Therefore, to maximize the diffusion efficiency, it is preferred that vertical diffusion tubes 11 are disposed on the neighboring parts of the module headers, that is, on the spots spaced 1 to 20 cm from the module headers.

In case of immersing such a module having diffusion function into source water for treatment, due to a difference in pressure caused by the head of water, the greater the water depth, that is, the closer to the lower part of the module, the lower the air flow rate. Thus, considering this, it is preferred that diffusion holes disposed on the two vertical diffusion tubes 11 become larger by 10 to 100% than the preceding holes as they are closer to the lower part of the module part. Preferably, the diffusion holes have a diameter of 2 to 8 mm.

In case of generating diffusion action by the aforementioned method, as bubbles generated from the diffusion tubes 11 at a lower part of an immersion tank rise, they continuously shake the hollow fiber membranes 16 disposed in a transverse direction, thus preventing the accumulation of contaminants. On the other hand, bubbles generated from the vertical diffusion tubes 11 at the left and right sides proceed horizontally to the hollow fiber membranes, thus preventing the accumulation of contaminants on the parts where the membranes are focused.

In order to prevent the degradation of performance caused by membrane contamination, the above-described submerged hollow fiber membrane module is designed so as to prevent the accumulation of contaminants by directly shaking hollow fiber membranes with bubbles generated from three surfaces. Because of this, there is a possibility that the membranes may be damaged when the module is operated for a long time. Hence, it is preferred to use hollow fiber membranes having a tensile strength higher than 1 kg/piece.

More preferably used are composite hollow fiber membranes having a tensile strength higher than 10 kg/piece made by reinforcing the hollow fiber membranes 16 constituting a hollow fiber membrane bundle by braided fabric.

In case of applying a submerged module to a large-scale water treatment process, it is advantageous to obtain a high treatment flow rate at a small installation area.

For this, the module according to the present invention can use a single unit module because throughput per module is very large, and can increase throughput since two or more unit modules can be combined without increasing the necessary project area.

ADVANTAGEOUS EFFECT

The submerged hollow fiber membrane according to the present invention eliminates the inefficiency of pipe arrangement caused by connecting a number of modules in parallel because throughput per module is large, is easy to expand module processing capacity, is excellent in durability and easy to work for the manufacture of a module by the minimization of module parts, and is very economical since most parts are made of moldable plastic.

Additionally, since the submerged hollow fiber membrane module has a structure capable of shaking the hollow fiber membranes with bubbles generated from three surfaces through diffusion tubes 11, it can effectively prevent fouling.

BRIEF DESCRIPTION OF THE DRAWINGS

FIG. 8 is a perspective view of a connecting member according to the present invention;

FIG. 9(a) is a plan view of a hollow fiber membrane protection device according to the present invention;

FIG. 9(b) is a front view of the hollow fiber membrane protection device according to the present invention;

FIG. 9(c) is a side view of the hollow fiber membrane protection device according to the present invention;

Figure 1:
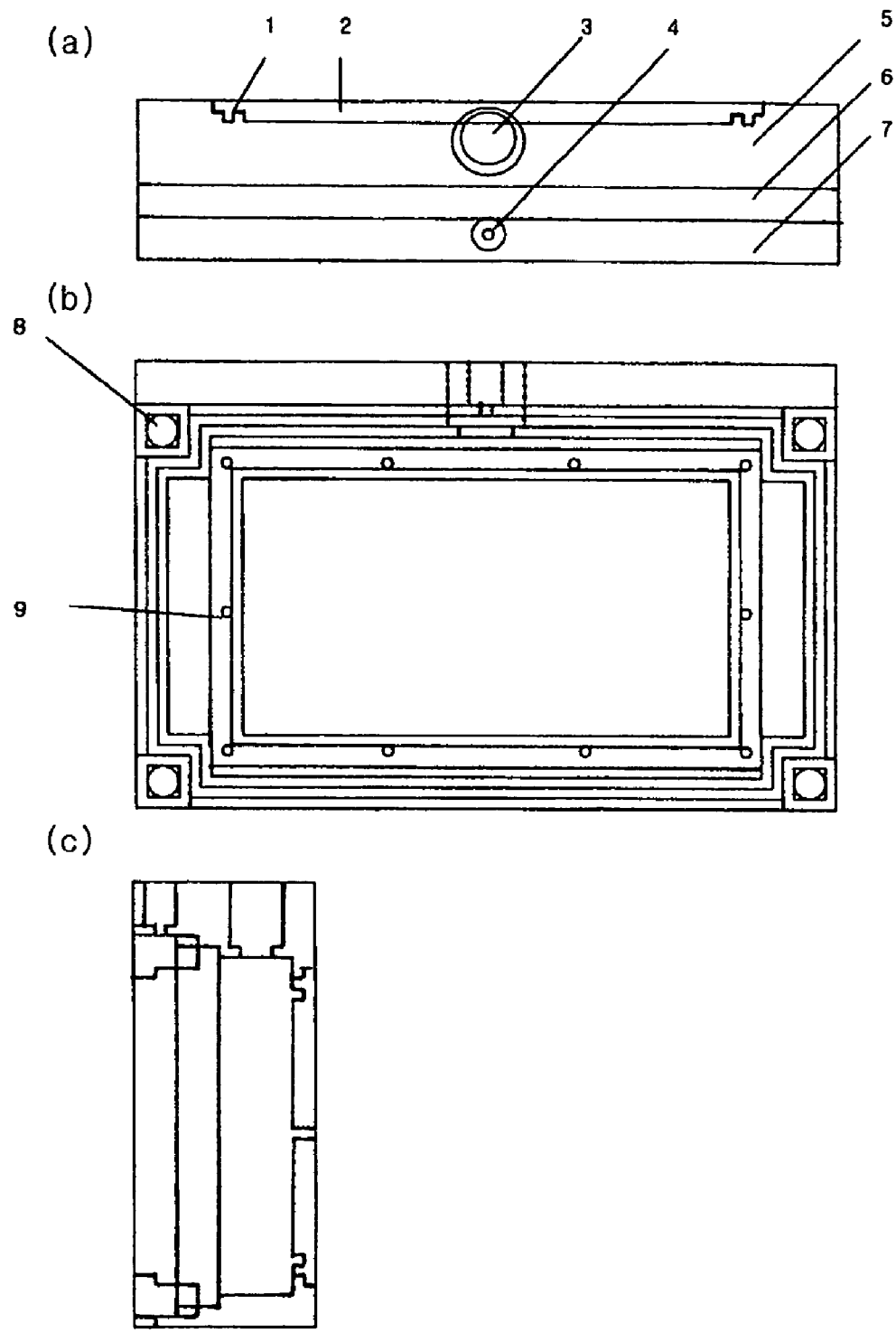
FIG. 1(a) is a plan view of a module body according to the present invention.
FIG. 1(b) is a front view of the module body according to the present invention.
FIG. 1(c) is a right side view of the module body according to the present invention.
Figure 2:
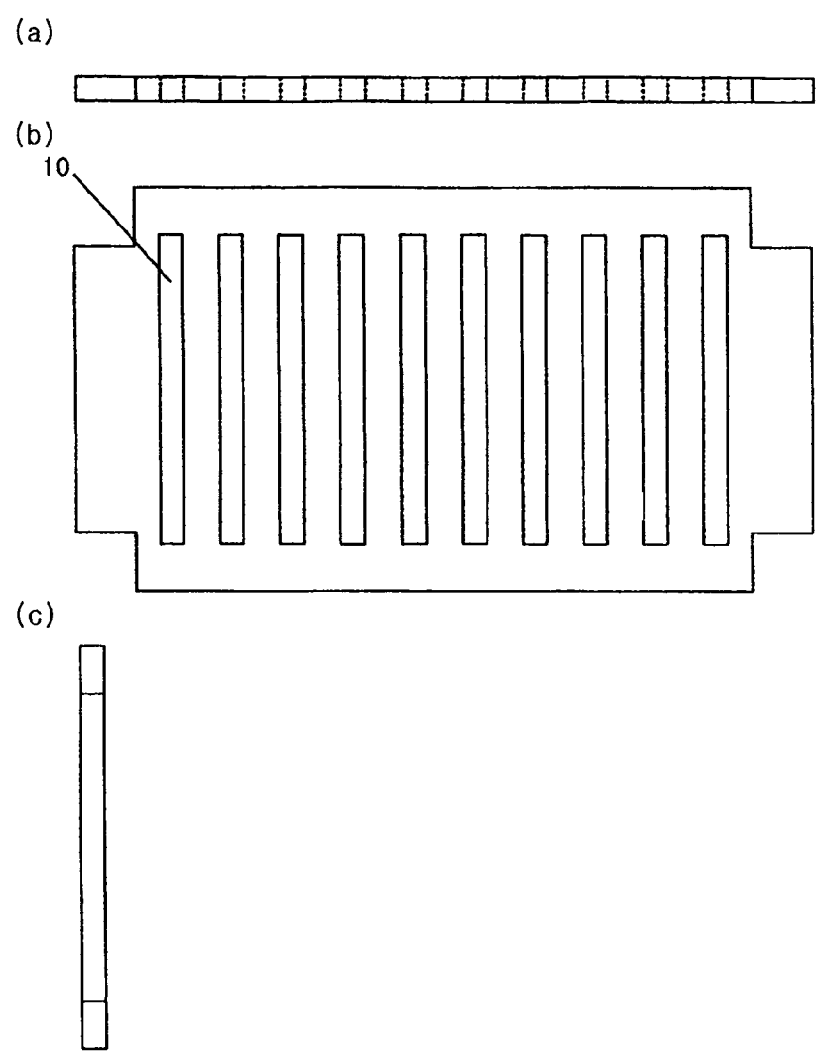
FIG. 2(a) is a plan view of a module header insertion layer according to the present invention.
FIG. 2(b) is a front view of the module header insertion layer according to the present invention.
FIG. 2(c) is a right side view of the module header insertion layer according to the present invention.
Figure 3:
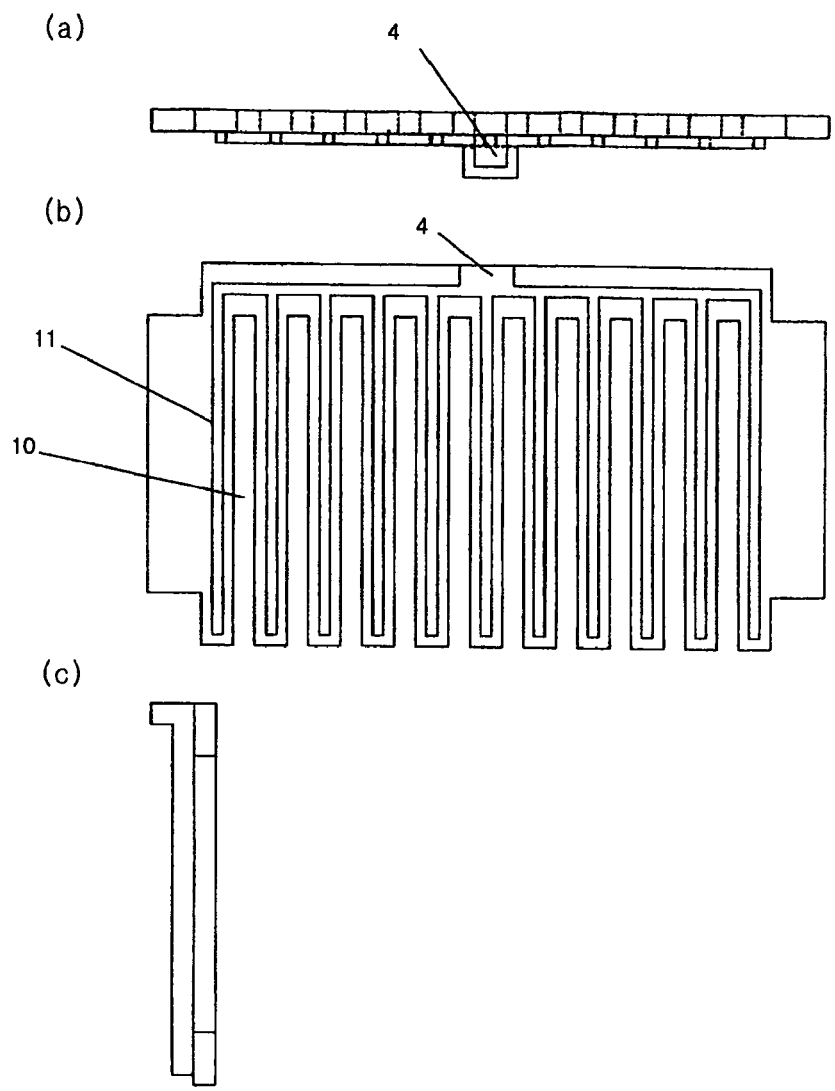
FIG. 3(a) is a plan view of a diffusion layer according to the present invention.
FIG. 3(b) is a front view of the diffusion layer according to the present invention.
FIG. 3(c) is a right side view of the diffusion layer according to the present invention.
Figure 4:
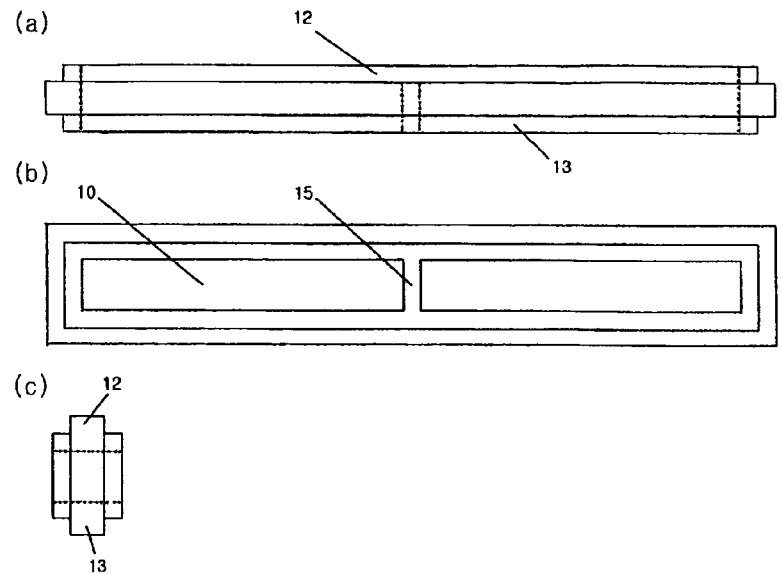
FIG. 4(a) is a plan view of a module header according to the present invention.
FIG. 4(b) is a front view of the module header according to the present invention.
FIG. 4(c) is a right side view of the module header according to the present invention.
Figure 5:
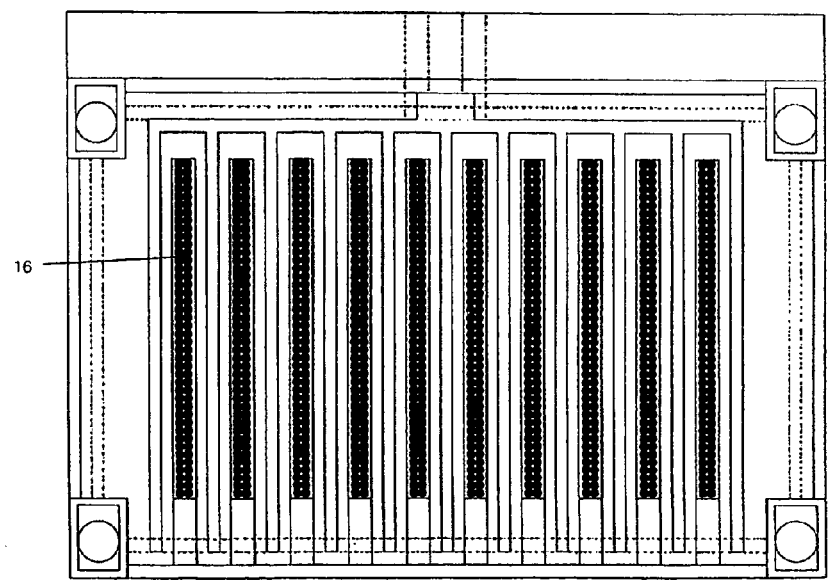
FIG. 5 is a schematic view showing the module header insertion layer, the diffusion layer, and the module header coupled to the module body.
Figure 6:
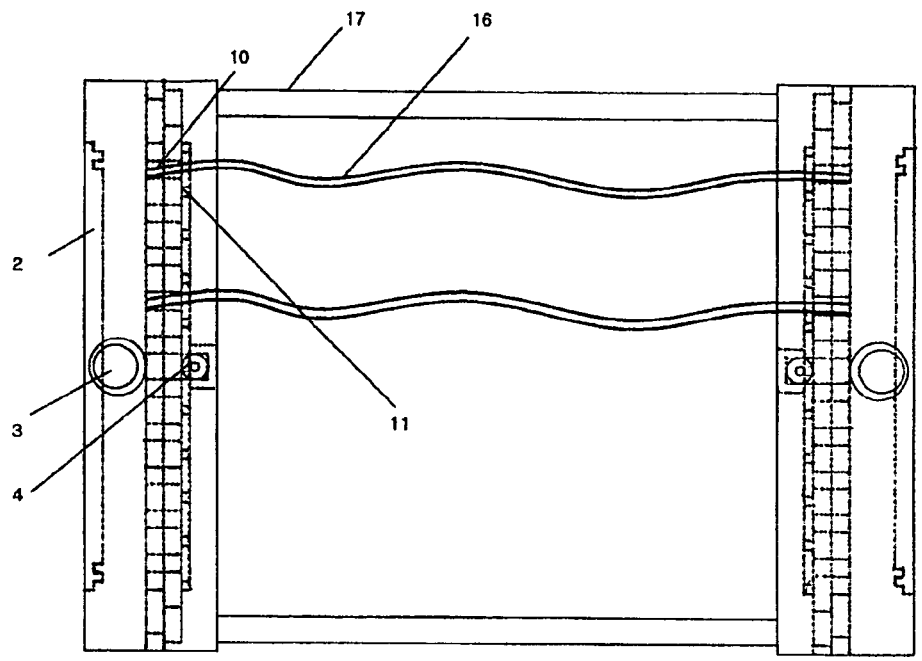
FIG. 6 is a plan view of a submerged hollow fiber membrane according to the present invention.
Figure 7:
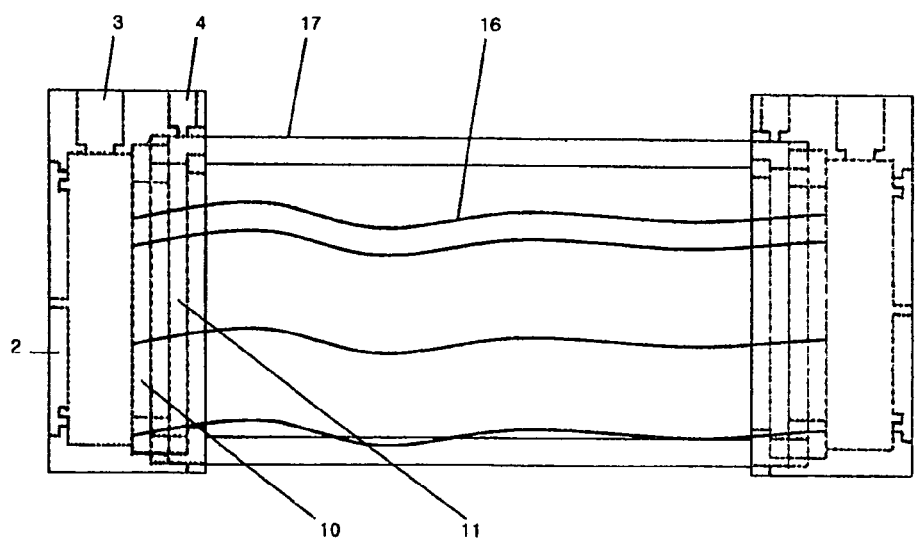
FIG. 7 is a side cross sectional view of the submerged hollow fiber membrane module according to the present invention.
Figure 10:
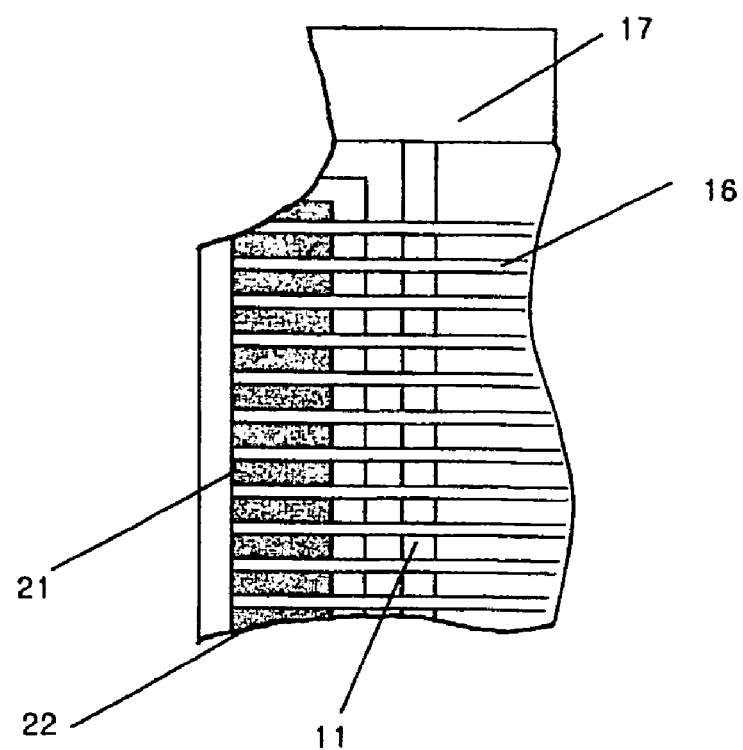
FIG. 10 is a cross sectional schematic view showing the module header and diffusion layer parts in the module body when cut out in the longitudinal and horizontal directions of the hollow fiber membranes of ※ Explanation of Reference Numerals for Main Parts of the Drawings

| | |
|---|---|
| 1: screw fixing groove | 2: module body cover |
| 3: permeated water outlet | 4: air injection port |
| 5: permeated water collection space | 6: interspace |
| 7: diffusion space | 8: module support tube fixing groove |
| 9: cover screw fixing groove | 10: hollow fiber membrane space |
| 11: diffusion tube | 12: separation membrane protection device fixing ridge |
| 13: module header fixing ridge | 15: module header divider |
| 16: hollow fiber membrane | 17: module support tube |
| 18: connecting member | 19: separation membrane protection device lock |
| 20: separation membrane protection device bracket | 21: permeated water surface |
| 22: potting liquid (adhesive) | |

INDUSTRIAL APPLICABILITY

The present invention is useful as a separation membrane module used in water treatment, such as wastewater treatment, sewage treatment, water purification, etc.

What is claimed is:

1. A submerged hollow fiber large membrane module, comprising:
    first and second module bodies;
    module support tubes between the first and second module bodies to keep the first and second module bodies spaced apart by a predetermined distance;
    first and second plate type module header insertion layers each of which has a plurality of hollow fiber membrane spaces disposed apart from one another, the first and second plate type module header insertion layers being inserted into the first and second module bodies respectively to form a permeated water collection space in each of the module bodies;
    first and second plate type diffusion layers which are provided at an upper portion thereof with an air injection port, the first and second plate type diffusion layers being inserted into the first and second module bodies respectively subsequent to the module header insertion layers to form a diffusion space in each of the module bodies; and
    at least two hollow fiber membrane units, each hollow fiber membrane unit including first and second module headers and a bundle of hollow fiber membranes disposed between the first and second module headers,
    wherein the first and second module headers of each of the at least two hollow fiber membrane units are inserted into the first and second module bodies respectively through the corresponding hollow fiber membrane spaces of the first and second plate type module header insertion layers such that the bundle of hollow fiber membranes are in fluid communication with the permeated water collection space and the module headers inserted into each module body are spaced apart from each other by the hollow fiber membrane spaces of each plate type module header insertion layer, and
    wherein each of the two plate type diffusion layers has diffusion tubes surrounding the bundle of hollow fiber membranes by three sides while being spaced apart by a predetermined distance from the module headers.

2. The submerged hollow fiber membrane module of claim 1, wherein the permeated water collection space in each of the module bodies is formed between an outside wall of the module body and the plate type module header insertion layer inserted into the module body.

3. The submerged hollow fiber membrane module of claim 1, wherein the diffusion space in each of the module bodies is formed between the plate type diffusion layer inserted into the module body and an inside wall of the module body.

4. The submerged hollow fiber membrane module of claim 1, wherein an interspace is formed between the permeated water collection space and the diffusion space in each of the module bodies.

5. The submerged hollow fiber membrane module of claim 1, wherein the distance between the module header and the diffusion tubes arranged adjacent thereto is 1 to 20 cm.

6. The submerged hollow fiber membrane module of claim 1, wherein a multiplicity of diffusion holes is formed on the diffusion tubes.

7. The submerged hollow fiber membrane module of claim 6, wherein the diameter of the diffusion holes is 2 to 8 mm.

8. The submerged hollow fiber membrane module of claim 6, wherein the closer the diffusion holes are to the lower part of the module, the larger the diffusion holes are.

9. The submerged hollow fiber membrane module of claim 1, wherein the tensile strength of the hollow fiber membranes constituting a hollow fiber membrane bundle is higher than 1 kg/piece.

10. The submerged hollow fiber membrane module of claim 1, wherein the hollow fiber membranes constituting a hollow fiber membrane bundle are composite hollow fiber membranes having a tensile strength higher than 10 kg/piece made by reinforcement by braided fabric.

11. The submerged hollow fiber membrane module of claim 1, wherein the shape of the module bodies is cylindrical rectangular.

12. The submerged hollow fiber membrane module of claim 1, wherein a connecting member for coupling the two submerged hollow fiber membranes modules is disposed on the air injection port.

13. The submerged hollow fiber membrane module of claim 12, wherein the connecting member has a passage for communicating permeated water and air between the first and second module headers serially coupled to each other and the diffusion tubes.

* * * * *